United States Patent
König et al.

(10) Patent No.: US 7,144,981 B2
(45) Date of Patent: Dec. 5, 2006

(54) PROCESS FOR SEPARATING VOLATILE COMPONENTS FROM POLYMERS

(75) Inventors: Thomas König, Leverkusen (DE); Klemens Kohlgrüber, Kürten (DE); Ulrich Liesenfelder, Bergisch Gladbach (DE); Michael Bierdel, Köln (DE); Helmut Meyer, Odenthal (DE); Richard Weider, Leverkusen (DE); Jörg Krüger, Krefeld (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 10/684,600

(22) Filed: Oct. 14, 2003

(65) Prior Publication Data

US 2004/0255780 A1 Dec. 23, 2004

(30) Foreign Application Priority Data

Oct. 17, 2002 (DE) ................ 102 48 571

(51) Int. Cl.
*C08F 6/00* (2006.01)

(52) U.S. Cl. .............. 528/501; 422/131; 422/135
(58) Field of Classification Search ............... 422/131, 422/135; 528/501
See application file for complete search history.

(56) References Cited

U.S. PATENT DOCUMENTS

| 4,215,024 A | 7/1980 | Gomez et al. ............ 260/23 S |
| 4,423,960 A | 1/1984 | Anders ..................... 366/75 |
| 4,537,734 A | 8/1985 | Morganstern ............... 264/22 |
| 4,699,976 A | 10/1987 | Matsubara et al. ........ 528/501 |
| 4,940,472 A | 7/1990 | Hay, II et al. .............. 55/195 |
| 5,453,158 A | 9/1995 | Cummings et al. ........ 159/47.1 |
| 5,691,445 A | 11/1997 | Krupinski et al. .......... 528/483 |
| 6,545,122 B1* | 4/2003 | Elsner et al. ............... 528/503 |

FOREIGN PATENT DOCUMENTS

| DE | 100 31 766 | 1/2002 |
| EP | 594 228 | 4/1994 |
| EP | 768 337 | 6/2000 |
| GB | 693376 | 7/1953 |
| GB | 1 227 493 | 4/1971 |

OTHER PUBLICATIONS

Chemische Industrie, 37(7), (month unavailable) 1985, pp. 473-476, F.A Streiff, G. Schneider, "Neue Mischverfahren mit geringem Energiebedarf für Polymerherstellung und -aufbereitung".
Patent Abstracts of Japan Bd. 12, Nr. 28, Jan. 27, 1988 & JP 62 179508 A (Mitsui Toatsu Chem Inc), Aug. 6, 1987.

* cited by examiner

*Primary Examiner*—Terressa Boykin
(74) *Attorney, Agent, or Firm*—Jennifer R. Sang

(57) ABSTRACT

A process for concentrating polymers by evaporation is disclosed. The process entails (i) obtaining a mixture containing a polymer and volatile component, the volatile components being present in the mixture at an amount less than 20 wt. % relative to the weight of the mixture, and (ii) introducing the mixture in a downward direction under pressure through a plurality of nozzles arranged vertically and next to one another into a degassing container to form an extrudate. The volatile component contains at least one of residual monomers, oligomers and solvents, and the throughput of the mixture per nozzle is 0.3 to 2 kg/h. The vapor pressure of the volatile component of the extrudate is more than 2.5 bar, and the absolute pressure in the degassing container is 50 to 5000 Pa. The polymer prepared by the process is characterized in that it contains volatile components in an amount of less than 300 ppm.

18 Claims, 1 Drawing Sheet

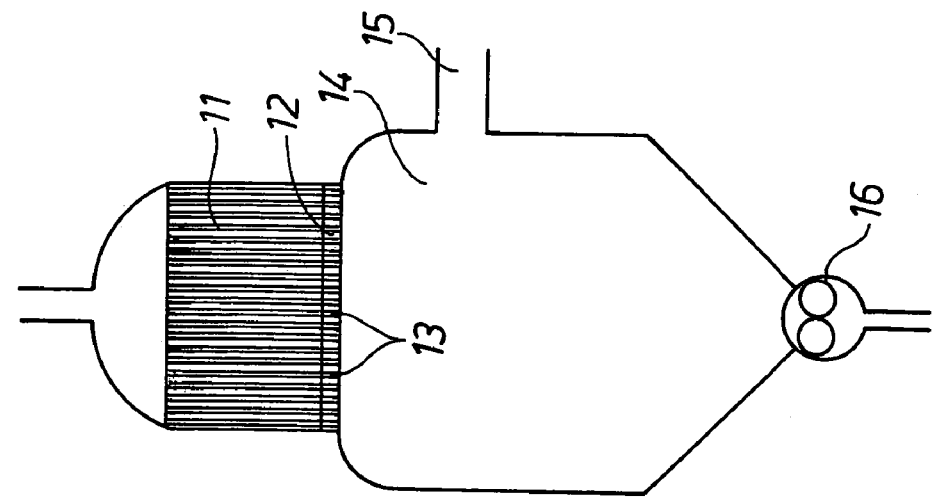
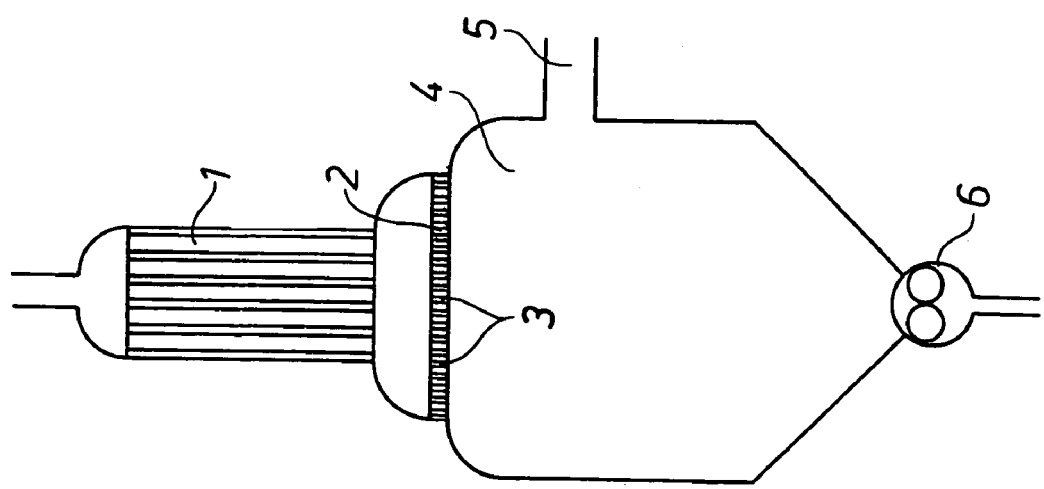

PROCESS FOR SEPARATING VOLATILE COMPONENTS FROM POLYMERS

FIELD OF THE INVENTION

The invention relates to polymeric resins and in particular to a process for separating volatile components therefrom.

SUMMARY OF THE INVENTION

A process for concentrating polymers by evaporation is disclosed. The process entails (i) obtaining a mixture containing a polymer and volatile component, the volatile components being present in the mixture at an amount less than 20 wt. % relative to the weight of the mixture, and (ii) introducing the mixture under pressure and through a, plurality of nozzles, arranged next to one another in a single plane into a degassing container to form an extrudate. The volatile component contains at least one of residual monomers, oligomers and solvents, and the throughput of the mixture per nozzle is 0.3 to 2 kg/h. The vapor pressure of the volatile component of the extrudate is more than 2.5 bar, and the absolute pressure in the degassing container is 50 to 5000 Pa. The polymer prepared by the process is characterized in that it contains volatile components in an amount of less than 300 ppm.

BACKGROUND OF THE INVENTION

The removal of volatile components from a polymer solution is one of the final process steps in the production of many polymers. The volatile components to be removed may, for example, be solvents, unpolymerized monomers or oligomers formed during the reaction. Removal of the residual volatile components from the polymers often involves heating, which may lead to undesired effects such as impairment of the intrinsic color, crosslinking or de-polymerization with reformation of monomers or oligomers. It is always of interest to combine small losses of quality with good degassing results, since the residual volatile components may impair the material properties and produce undesired odors, and there are also the health considerations since many of these substances are toxic.

Various methods for removing the volatile components from the polymer solution are known. Removal of residual monomers by chemical means is described, for example, in EP 0 768 337 A1. The removal is carried out by adding CH-acidic organic compounds. The chemical conversion of residual monomers likewise leads to products with undesired ecological relevance, which makes it significantly more difficult to use the products in practice. This method also cannot be used for removing residual solvents.

The method for reducing residual monomers with unsaturated fatty acids according to U.S. Pat. No. 4,215,024 suffers from the same deficiencies.

Another known method describes the reduction of residual monomers by treating the molding compositions with electron beams, as described in DE 28 43 292 A1. The method is, however, much too expensive to be implemented on an industrial scale. A method described in EP 0 798 314 A1 for removing residual volatile components by injecting supercritical solvents into the polymer melt, with a subsequent expansion, is found to be just as expensive.

Conventional methods are based on the removal of residual monomers and solvents with the aid of mechanically supported systems. For example, extruders (U.S. Pat. No. 4,423,960), degassing centrifuges (U.S. Pat. No. 4,940,472) or thin-film evaporators (DE 19 25 063 A1) are used.

All these methods have the disadvantage of requiring heavy moving parts in devices. This leads to processes which are cost-intensive and susceptible to malfunction and wear. The large mechanical energy input in such a process also leads to high temperatures, which in turn promote product damage. The mechanical energy is usually generated from electrical energy, which leads to high costs and a greater burden on the environment compared to the use of primary energy.

DE 100 31 766 A1 proposes a two-stage continuous method for degassing styrene copolymers, in which the polymer concentration is brought to more than 99.8 wt. % in a first stage in a shell-and-tube heat exchanger by evaporating volatile components with simultaneous energy input, and the final concentration is reached in a second stage, an extrusion evaporator, without intermediate overheating. Disadvantages of this method are the long residence time at high temperature in the bottom of the two stages, which may lead to undesired product discoloration, and in the long residence time in the tube evaporator of the first stage, in which heating takes place with a high wall temperature in the presence of residual monomers.

U.S. Pat. No. 4,699,976 describes a two-stage continuous method for degassing styrene polymers containing rubber. This method uses two degassing stages, which are equipped with shell-and-tube heat exchangers. In the first stage, the polymer solution is concentrated to a residual volatile-component content of between 3% and 15%. In the second stage, evaporation takes place to the final concentration. Foaming takes place inside the tubes. Disadvantages in this case are the long residence time with exposure to heat and in the presence of residual monomers, which is due to the use of conventional shell-and-tube equipment in the second stage.

EP 0 749 343 B1 describes an apparatus and a method in which the heat transfer to the polymer solution takes place using a specially formed plate heat exchanger. The product in this case emerges horizontally from horizontal slits arranged above one another. Disadvantages of this arrangement are that different foamed polymer extrudates combine together, so that the accessibility of the vacuum to the polymer extrudates is made more difficult. Such an arrangement will therefore have high residual volatile-component contents, which is undesired.

"Neue Mischverfahren mit geringem Energiebedarf für Polymerherstellung und-aufbereitung", Chemische Industrie (1985) 37(7), pages 473 to 476 describes a method with which an entrainer is mixed with the polymer prior to the last stage, before the product is brought into the last stage, a degassing container. Primarily, as is familiar to the person skilled in the art, inert gases such as nitrogen or carbon dioxide, or alternatively water, are used as entrainers. Both methods have disadvantages. Inert gases reduce the power of the coolers in which the volatile components are intended to condense, and increase the volume to be delivered by the vacuum system, so that the method becomes more expensive. The use of water is disadvantageous because the temperature of the condensers must then be restricted to above 0° C. in order to prevent freezing, so that the power of the condensation system is restricted, which in turn needs to be compensated for by a larger and more expensive vacuum pump.

BRIEF DESCRIPTION OF THE FIGURES

FIG. 1 is a schematic representation of one embodiment of the invention.

FIG. 2 is a schematic representation of a second embodiment of the invention.

DETAILED DESCRIPTION OF THE INVENTION

The invention provides a method for concentrating polymers by evaporation, characterized in that a mixture of polymers and volatile component that contains at least one of residual monomers, oligomers and solvents, is introduced in a downward direction under pressure through a plurality of nozzles arranged vertically and next to one another—that is extruded into a degassing container. The nozzles are preferably all located on the same plane. The process is characterized in that the throughput of the mixture per nozzle is 0.3 to 2 kg/h, preferably 0.5 to 1.5 kg/h and particularly preferably 0.7 to 1.3 kg/h, in that the vapor pressure of the volatile component entering the degassing container is more than 2.5 bar, the concentration of the volatile component is less than 20 wt. %, and the absolute pressure in the degassing container is in particular from 50 to 5000 Pa, preferably from 100 to 1500 Pa.

A preferred method is one which is characterized in that the number of nozzles, expressed in terms of area, is from 1500 to 5000 nozzles per square meter, preferably from 2000 to 3500 nozzles per square meter.

A preferred method is also one which is characterized in that the free cross-sectional area of the nozzles, that is the inner diameter of the nozzle, is from 0.3 to 2 $cm^2$, preferably from 0.5 to 1.2 $cm^2$.

The size of the degassing container is also a factor in determining the investment cost, and therefore the economic viability of a polymer degassing method. Above all, the cross-sectional area which is attributed to all the nozzles has an important effect in this. Too small a nozzle spacing is unfavorable, however, since adhesion of the foamed extrudates then occurs, which results in inferior vacuum accessibility and therefore inferior degassing. It has been found particularly favorable to arrange between 1500 and 5000 nozzles per square meter, preferably between 2000 and 3500 nozzles per square meter. The nozzles may be arranged in various ways familiar to the person skilled in the art, for example in a rectangular or triangular arrangement. Arrangement of the nozzles at the vertices of equilateral triangles is preferable. The cross-sectional area of the nozzles is favorably between 0.3 and 2 $cm^2$, preferably between 0.5 and 1.2 $cm^2$. The shape of the nozzles may be rectangular, slit-shaped, oval or circular. Circular nozzles are preferred.

As a rule, heating of the polymer solution is needed in order to achieve the temperature which is necessary for the vapor pressure according to the invention. This may preferably be done in a heat exchanger with indirect heat exchange. A particularly short residence time in the flow of channels of the heat exchanger, which is useful for protecting the product, is obtained when the nozzles from which the polymer solution emerges are directly connected to the individual channels of the heat exchanger. As a special case, the nozzles may have the same cross-sectional geometry as the channel of the heat exchanger. Selection of heat exchangers which have a shorter residence time and higher heat transfer, compared to the conventional design with cylindrical tubes has been found to be favorable for the product quality.

It is also favorable that a lower wall temperature, the temperature of the wall of the tube, is needed for reaching a final temperature necessary for the degassing. Flattened tubes or tubes with inserts to improve the heat transfer are preferred in this case, such as described for example in U.S. Pat. No. 4,062,525 in "Neue Mischverfahren mit geringem Energiebedarf für Polymerherstellung und-aufbereitung", Chemische Industrie (1985) 37(7), pages 473 to 476, in "Statische Mischer und ihre Anwendung", Chemie-Ingenieur-Technik 52 (1980) No 4, pages 285–291. Flattened tubes and the helical mixers described in the above citations are preferred. Preferred tubes are ones whose internal diameter before deformation, that is before flattening, is between 8 and 15 mm, preferably between 10 and 12 mm, and whose length is between 200 and 1000 mm, preferably between 300 and 700 mm, and which are flattened in such a way that the internal width of the gap is between 2.5 and 6 mm, preferably between 3 and 5 mm. The geometry preferred for the helical mixers is an internal diameter of between 7 and 15 mm, particularly preferably between 10 and 12 mm, and a length of between 100 and 500 mm, preferably between 150 and 300 mm.

A preferred method is also one which is characterized in that the polymer solution is heated, before entering the nozzles, by a heat exchanger, the residence time of the polymer solution in the heat exchanger is one half to three minutes, preferably one to two minutes, and each channel of which is preferably connected directly to a separate nozzle.

A preferred method is also one which is characterized in that the heat exchanger contains a static mixing device, preferably a helical mixer, in order to improve the heat transfer, the preferred internal diameter of the mixing device being from 7 to 15 mm, particularly preferably from 10 to 12 mm, and its preferred length being from 100 to 500 mm, preferably from 150 to 300 mm.

A preferred method is also one which is characterized in that the heat exchanger is in the form of round tubes, which have been flattened in the middle in order to improve the heat transfer. The original round tubes are ones having a circular cross-section. These tubes are flattened such to form a constriction, or gap, at half the length of the tube. Preferably these are made of tubes having an internal diameter, before flattening, of 8 to 15 mm, preferably 10 to 12 mm, and having a length of 200 to 1000 mm, preferably 300 to 700 mm, and which are flattened in such a way that the gap is 2.5 to 6 mm, preferably 3 to 5 nm.

A preferred method is also one which is characterized in that one or more evaporation stages are used for pre-concentration to less than 20 wt. %.

If a solution which contains between 50 and 80 wt. % of polymer is obtained from the reaction or a prior evaporation stage, then according to the invention this solution will be evaporated to a concentration >80 wt. % in a pre-evaporation stage. Conventionally, a degassing container to which the product flows from a heat exchanger will be used for this. The latter may be designed in various ways. For example, it is possible to use a conventional shell-and-tube heat exchanger, a helical mixer or a coiled tube, as described for example in DE 27 19 968 C2. The degassing container has one or more openings, through which the volatile components are drawn off in gas form. The absolute pressure in the degassing container is selected to be between 0.5 and 3 bar, and a pressure of between 1 and 2 bar is preferred.

Also using a heat exchanger with a short residence time (between one half and three, preferably between one and two minutes) and improved heat transfer for the preliminary evaporation concentration stage is particularly favorable for the product quality. A preferred heat exchanger is in this case one whose flow channels consist of flattened tubes which, before deformation, had an internal diameter of from 8 to 20 mm, preferably from 8 to 14 mm, particularly preferable 10–12 mm, flattened to from 2.5 to 7 mm, preferably to from 3 to 5 mm, with a length of between 200 and 3000 mm, preferably between 300 and 1500 mm, particularly preferably between 500 and 1000 mm, or a helical mixer. Internal diameters of between 8 and 15 mm, and especially between 10 and 12 mm, are preferred for the helical mixer. The length of the helical mixer is preferably between 100 and 1000, preferably between 200 and 500 mm.

The main problem involved with the pre-evaporation stage is that poor distribution of the polymer solution may occur between individual flow channels, as described for example in "Slit Devolatilization", G. Ianniruberto et al., in "Polymer Devolatilization", Marcel Dekker Inc., 1996, ISBN 0-8247-9627-6, pages 291–323. According to the invention, this problem is resolved by building an additional flow resistance into each flow channel of the heat exchanger. This may, for example, be a tube constriction, one or more elements of a static mixer or an aperture. An aperture with a diameter of from 1.5 to 3 mm is preferred. The length of the aperture may lie between 5 and 150 mm, preferably between 20 and 70 mm. This is preferably done in the region where the polymer solution is present in single-phase form, particularly preferably at the entry of the flow channel.

A preferred method is also one which is characterized in that a homo- or copolymer of styrene is processed, preferably a copolymer of styrene/acrylonitrile, styrene/methyl methacrylate, styrene/methyl methacrylate/acrylonitrile, α-methyl styrene/acrylonitrile, styrene/α-methyl styrene/acrylonitrile, styrene/N-phenyl maleimide and styrene/N-phenyl maleimide/acrylonitrile with a vinyl-aromatic content of advantageously from 40 to 85 wt. %, particularly preferably styrene copolymers of styrene-acrylonitrile and a-methyl styrene/acrylonitrile with advantageously from 67 to 84 wt. % vinyl aromatic and from 16 to 33 wt. % acrylonitrile.

A preferred method is also one which is characterized in that a rubber-modified homo- or copolymer of styrene is processed, preferably a copolymer of styrene/acrylonitrile, styrene/methyl methacrylate, styrene/methyl methacrylate/acrylonitrile, a-methyl styrene/acrylonitrile, styrene/a-methyl styrene/acrylonitrile, styrene/N-phenyl maleimide and styrene/N-phenyl maleimide/acrylonitrile with a vinyl-aromatic content of preferably from 40 to 85 wt. %, particularly preferably styrene copolymers of styrene-acrylonitrile and α-methyl styrene/acrylonitrile with preferably from 67 to 84 wt. % vinyl aromatic and from 16 to 33 wt. % acrylonitrile, wherein polybutadiene and a terpolymer of ethylene, propylene and ethylidene norbornene is preferably used as the rubber-like polymer.

The invention also provides a styrene polymer with or without rubber components, which is processed using the method according to the invention and has a residual volatile-component content of less than 300 ppm.

The method according to the invention is suitable for removing any volatile components from polymers, in particular for removing low-molecular-weight monomeric or oligomeric components from solutions of uncrosslinked thermoplastic polymers in their monomers or any solvents, with the aim of producing polymers with a low content of residual volatile-component.

The described method is suitable especially for the production of styrene copolymers with good color and of rubber-modified styrene copolymers with good color and good mechanical properties.

Polymers which are particularly relevant for the separation of volatile components are all uncrosslinked, thermoplastic polymers such as e.g. homo- or copolymers of styrene, acrylic acids, acrylates and methacrylates, carbonates, esters, amides, urethanes, phenyl ethers and sulfides, to name but a few members of this class of substances.

Thermoplastic polymer solutions more particularly usable for the separation of low-molecular-weight volatile components by the method according to the invention are the reaction solutions of styrene polymers and styrene copolymers. These are vinyl polymers which consist at least of a vinyl-aromatic monomer, especially styrene, a-methyl styrene or a ring-substituted styrene, optionally copolymerized with one or more different ethylenically unsaturated monomers from the group acrylonitrile, methacrylonitrile, esters of acrylic acid or methacrylic acid, maleic anhydride and N-substituted maleimide, and optionally in the presence of one or more additionally contained dissolved or swollen rubber-like polymers. The reaction solution may furthermore contain solvents. These are in general low-boiling-point compounds which are miscible with the reaction solution. They may, for example, be aromatic compounds such as benzene, toluene, ethyl benzene, monochlorobenzene or xylene, ketones such as propanone and 2-butanone or higher ketones, alcohols such as methanol, ethanol, n- or isopropanol or higher alcohols, ethers, chloroalkanes such as mono- or dichloromethane or unchlorinated alkanes such as pentane, n-hexane or cyclohexane.

Preferably usable vinyl polymers are those of styrene/acrylonitrile, styrene/methyl methacrylate, styrene/methyl methacrylate/acrylonitrile, α-methyl styrene/acrylonitrile, styrene/α-methyl styrene/acrylonitrile, styrene/N-phenyl maleimide and styrene/N-phenyl maleimide/acrylonitrile with a vinyl-aromatic content of advantageously from 40 to 85 wt. %.

Particularly preferably usable vinyl polymers are those of styrene-acrylonitrile and α-methyl styrene/acrylonitrile with advantageously from 67 to 84 wt. % vinyl aromatic and from 16 to 33 wt. % acrylonitrile.

The vinyl polymers according to the invention advantageously have weight average molecular weights Mw of 10,000 g/mol to 200,000 g/mol and intrinsic viscosities [η] of between 20 and 100 ml/g, measured in dimethyl formamide at 25° C.

Such vinyl polymers are widely known. These polymers may be produced by bulk, solution, suspension or emulsion polymerization, optionally with the addition of suitable polymerization initiators. Particularly suitable for the method according to the invention, however, are the reaction solutions of bulk and solution methods, which may optionally contain up to 25 wt. %, particularly preferably up to 18 wt. %, of rubber-like polymers additionally added to the polymerization. These rubber-like polymers may, for example, be polybutadiene, polyisoprene or polychloroprene, or copolymers which contain more than 50 wt. % of butadiene or isoprene as well as further vinyl monomers such as styrene, α-methyl styrene or acrylonitrile. The copolymers may be present in a random structure or as block copolymers. The said rubber-like compounds may be partially or fully hydrogenated. It is furthermore possible to use ethylene copolymers such as a copolymer of ethylene, propylene and a diene component, for example ethylidene norbornene. Polybutadiene and a terpolymer of ethylene, propylene and ethylidene norbornene are preferred as the rubber-like polymer.

According to the invention, the degassing task is accomplished by extruding a polymer solution, which is laden with volatile components from previous process steps, through one or more nozzles arranged next to one another, into a degassing container. The temperature of the emerging extrudate is selected in such a way that the polymer solution has a vapor pressure of more than 2.5 bar at the entry into the process step. It should be born in mind that, if this vapor pressure is obtained by computational means, the interaction of volatile components with the polymer needs to be taken into account. There is an absolute pressure of from 50 to 5000 Pa, preferably from 100 to 1500 Pa, in the degassing container. The polymer therefore foams and forms foamed extrudates, which extend down into the degassing container and break under their own weight after a certain distance. The polymer then collects in the bottom of the degassing container and is extracted using a device familiar to the person skilled in the art, for example a gear or extruder pump. The vapors are discharged through openings in the degassing container. The nozzles are preferably arranged at the same height, but arrangement at different heights is also possible. The high vapor pressure of the polymer solution is advantageous because this leads to strong foaming and a good degassing result, without using non-condensable entrainers which would burden the vacuum system.

The invention will be elucidated in more detail below on the basis of the Figures. In FIG. 1 there is shown a degassing container 4, having an outlet 5, for the highly volatile components and a discharge device 6, for the polymer. The mixture of polymer with volatile components is extruded in a downward direction into the top of the degassing container through a plurality of nozzles 3. The nozzles are arranged next to one another in the nozzle plate, 2, i.e. in a common plane. Before entering the nozzles 3, the mixture is heated in a heat exchanger 1.

In FIG. 2 another embodiment is shown. In this embodiment each channel of the heat exchanger 11 is connected directly to a nozzle 13 in the nozzle plate 12. The degassing container 14 is equipped with an outlet 15, for the highly volatile components and with a discharge device 16, for the polymer. The mixture of polymer with volatile components is extruded in a downward direction into the top of the degassing container through a plurality of nozzles 13. The nozzles are arranged next to one another in the nozzle plate, 12. Before entering the nozzles 13, the mixture is heated in a heat exchanger 11.

EXAMPLES

Example 1

19 kg/h of an elastomeric styrene-acrylonitrile copolymer with residual monomers and solvents were extruded throughout 19 bores into a degassing container. The diameter of the openings was 10 mm. The composition of the volatile components was 3 wt. % of acrylonitrile, 65 wt. % of styrene, 25 wt. % of ethyl benzene and 7 wt. % of 2-butanone. The pressure in the degassing container was between 1100 and 1200 Pa. The total proportion of volatile components was varied, as was the temperature of entry into the degassing container.

Table 1 shows the vapor pressures of the solution at the temperature of entry into the degassing container, and the residual contents which were achieved. It is clear that a vapor pressure of more than 2.5 bar is necessary for a good degassing result.

TABLE 1

| | | | Residual content | | | |
|---|---|---|---|---|---|---|
| Temp. | Volatile-component content | Vapor pressure | Acrylo-nitrile | Styrene | Ethyl benzene | Butanone |
| 240° C. | 4.2% | 1.91 bar | 33 ppm | 1364 ppm | 673 ppm | 151 ppm |
| 240° C. | 9.4% | 3.8 bar | 3 ppm | 127 ppm | 55 ppm | 8 ppm |
| 210° C. | 9.4% | 2.4 bar | 8 ppm | 572 ppm | 309 ppm | 37 ppm |

If the polymer solution is present with more than 20 wt. % in the feed, it is favorable to evaporate it initially to a concentration of less than 20 wt. % in a preliminary stage at a cooler temperature, before sending it into the final stage, since the gas speeds and the cost for the vacuum technology are otherwise too high.

Example 2

A solution of a rubber-modified styrene-acrylonitrile copolymer, that is ABS, was expanded, through an opening with a diameter of 10 mm, into a degassing container with an absolute pressure of 1000 Pa. The polymer throughput was between 1 and 3 kg/h. The temperatures of the solution when entering into the degassing container were between 229° C. and 230° C. The proportion of volatile components was 10 wt. % of the total solution. The composition of the volatile components was .5 wt. % of acrylonitrile, 20 wt. % of 2-butanone and 75 wt. % of styrene. Table 2 shows the residual contents which were achieved. The advantage of the low flow rates for the degassing results is clear.

It has surprisingly been found that it is advantageous for minimal residual contents if the polymer throughput per bore is selected to be less than 2 kg/h, preferably less than 1.5 kg/h and particularly preferably less than 1.3 kg/h.

TABLE 2

| | Residual content | | |
|---|---|---|---|
| Throughput | Acrylonitrile | Butanone | Styrene |
| 1 kg/h | 8 ppm | <20 ppm | 28 ppm |
| 2 kg/h | 14 ppm | 97 ppm | 560 ppm |
| 3 kg/h | 23 ppm | 210 ppm | 1100 ppm |

Example 3

Table 3 shows the temperatures of the extrudate at the point of introduction into the degassing container, measured at the nozzles, and the residence time for a 1.5 kg/h throughput of a solution of a butadiene rubber-modified copolymer of styrene and acrylonitrile. The entry concentration of the solution was in the range of from 12 to 13 wt. % of volatile components. The exit pressure was 1000 Pa. A cylindrical tube (1310 mm in length) having an internal diameter of 10 mm is compared with a tube measuring 700 mm in length, which was flattened over a length of 600 mm so as to leave a gap with an internal width of 5 mm. Upon comparison of the entry temperatures the superiority of the flattened tube is clearly shown. The greater pressure drop is in the range of that which is easy to cope with technically.

TABLE 3

| Tube length | 1310 mm | 700 mm |
|---|---|---|
| Tube geometry | cylindrical | flattened over 600 mm |
| Nozzle diameter | 10 mm | 10 mm |
| Entry temperature (tube) | 180° C. | 170° C. |
| Entry temperature (degassing container) | 218° C. | 226° C. |
| Proportion of volatile components | 12.3% | 13% |
| Pressure drop | 15.4 bar | 40 bar |
| Residence time | 184 s | 77 s |

Residence time of the product between one half and three, preferably between one and two minutes, in the channels of the heat exchanger is favorable.

Example 4

6 kg/h of a reaction solution with 3.3 kg/h of a copolymer having 76 wt. % styrene and 24 wt. % acrylonitrile were evaporated to a polymer content of 86.25 wt. % and 13.75 wt. % of volatile components in a first stage. The heat exchanger of the first stage was a tube with a total length of 1100 mm, which had been flattened to a gap width of 4 mm over a length of 1075 mm. The pressure in the first stage was 1 bar.

The solution pre-evaporated in the first stage was heated In a heat exchanger, which consisted of 3 tubes with an internal diameter of 12 mm and a length of 340 mm, which had been flattened to a 3.5 mm gap over a length of 300 mm. The exit temperature was 221° C. The nozzle had a circular cross section with a diameter of 12 mm. The vapor pressure of the solution at the temperature at the exit was 3.4 bar. The pressure in the settling container was 120 Pa. The light absorbance was determined in a solution of 5 wt. % polymer in tetrahydrofuran with illumination through a cuvette of thickness 100 mm in a dual-beam photometer with pure THF as the reference: it was 3.24% at a wavelength of 450 nm, 1.97% at 550 nm and 1.66% at 650 nm. The residual contents were 2 ppm of acrylonitrlle, 38 ppm of ethyl benzene and 60 ppm of styrene.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for concentrating polymers by evaporation comprising:
    (i) obtaining a mixture containing a polymer and volatile component, the volatile components being present in the mixture at an amount less than 20 wt. % relative to the weight of the mixture, and
    (ii) introducing the mixture under pressure and through a plurality of nozzles arranged next to one another in a single plane into a degassing container to form an extrudate,
    wherein the volatile component contains at least one member selected from the group consisting of residual monomers, oligomers and solvents, and wherein the throughput of the mixture per nozzle is 0.3 to 2 kg/h, the vapor pressure of the volatile component of the extrudate is more than 2.5 bar, and the absolute pressure in the degassing container is 50 to 5000 Pa.

2. The process according to claim 1, wherein the plurality of nozzles refers to 1500 to 5000 nozzles per square meter.

3. The process according to claim 2, wherein each nozzle has a free cross-sectional area of 0.3 to 2 cm$^2$.

4. The process according to claim 1 wherein the mixture is heated, before entering the nozzles, by subjecting it to residence time of 0.5 to 3 minutes in a heat exchanger having channels wherein each channel is connected directly to a separate nozzle.

5. The process according to claim 4, wherein the heat exchanger contains a static mixing device.

6. The process of claim 5 wherein the static mixing device is a helical mixer.

7. The process of claim 6 wherein the helical mixer has an internal diameter of 7 to 15 mm and length of 100 to 500 mm.

8. The process according to claim 4, characterized in that the heat exchanger is in the form of round tubes flattened in the middle the tubes having an internal diameter before deformation of 8 to 15 mm, and length of 200 to 1000 mm the flattenning creating an internal gap of 2.5 to 6 mm.

9. The process of claim 1 wherein the polymer is a homo- or copolymer of styrene.

10. The process of claim 8 wherein polymer is selected from the group consisting of copolymer of styrene/acrylonitrile, styrene/methyl methacrylate, styrene/methyl methacrylate/acrylonitrile, α-methyl styrene/acrylonitrile, styreneα-methyl styrene/acrylonitrile, styrene/N-phenyl malelmide and styrene/N-phenyl maleimide/acrylonitrile.

11. The process according to claim 1 wherein the polymer is a rubber-modified homo- or copolymer of styrene.

12. The process of claim 11 wherein the copolymer is a blend selected from the group consisting of styrene/acrylonitrile, styrene/methyl methacrylate, styrene/methyl methacrylate/acrylonitrile, α-methyl styrene/acrylonitrile, styrene/α-methyl styrene/acrylonitrile, styrene/N-phenyl maleimide and styrene/N-phenyl maleimide/acrylonitrile.

13. The process according to claim 1, wherein the concentrated polymer is characterized in that it contains volatile-component in an amount of less than 300 ppm.

14. The process of claim 10 wherein the copolymer contains vinyl-aromatic in an amount of 40 to 85% relative to its weight.

15. The process of claim 10 wherein the copolymer is a member selected from the group consisting of styrene-acrylonitrile and α-methyl styrene/ acrylonitrile.

16. The process of claim 15 wherein the copolymer contains vinyl-aromatic in an amount of 67 to 84 % and acrylonitrile in an amount of 16 to 33% relative to its weight.

17. The process according to claim 1, wherein the plurality of nozzles area arranged in a single plane.

18. The process according to claim 4, wherein each channel is connected directly to a separate nozzle.

* * * * *